US010355980B2

(12) United States Patent
Tambakuwala et al.

(10) Patent No.: US 10,355,980 B2
(45) Date of Patent: Jul. 16, 2019

(54) DETERMINISTICALLY SELECTING A BYPASS LSP FOR A DEFINED GROUP OF PROTECTED LSPS

(71) Applicant: Juniper Networks, Inc., Sunnyvale, CA (US)

(72) Inventors: Himanshu Kumar Tambakuwala, Bangalore (IN); Nischal Singh, Bangalore (IN); Nipun Chawla, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 113 days.

(21) Appl. No.: 15/281,896

(22) Filed: Sep. 30, 2016

(65) Prior Publication Data

US 2018/0097719 A1    Apr. 5, 2018

(51) Int. Cl.
*H04L 12/24* (2006.01)
*H04L 12/703* (2013.01)
*H04L 12/707* (2013.01)
*H04L 12/723* (2013.01)

(52) U.S. Cl.
CPC .......... *H04L 45/22* (2013.01); *H04L 41/0654* (2013.01); *H04L 45/28* (2013.01); *H04L 45/50* (2013.01)

(58) Field of Classification Search
None
See application file for complete search history.

(56) References Cited

U.S. PATENT DOCUMENTS

| 7,024,463 B1 * | 4/2006 | Hitomi | G05B 19/052 709/201 |
| 7,184,437 B1 | 2/2007 | Cole et al. | |
| 7,406,032 B2 * | 7/2008 | Li | H04L 41/06 370/217 |
| 7,720,061 B1 | 5/2010 | Krishnaswamy et al. | |

(Continued)

OTHER PUBLICATIONS

"CLI differences between a protected LSP and a bypass LSP," retrieved from http://www.brocade.com/content/html/en/configuration-guide/netiron-05900-mplsguide/GUID-20C18F39-2015-4905-AACE-33B534047B5E.html, Jul. 15, 2016, 1 pp.

(Continued)

*Primary Examiner* — Ayaz R Sheikh
*Assistant Examiner* — Tarell A Hampton
(74) *Attorney, Agent, or Firm* — Shumaker & Sieffert, P.A.

(57) ABSTRACT

In one example, a method includes receiving, by a network device, first data defining a group of LSPs, receiving second data defining one or more constraints for one or more bypass LSPs, and receiving third data defining a mapping between the group of LSPs and the one or more bypass LSPs. The method also includes, in response to receiving the third data, automatically signaling, by the network device, a bypass LSP in accordance with the one or more constraints, selecting, by the network device and based on the mapping, a respective alternate next hop for rerouting network traffic received on each LSP of the group of LSPs to the signaled bypass LSP, and programming a forwarding component of the network device to install each of the respective alternate next hops as alternate next hops to primary next hops for the LSPs of the group of LSPs.

20 Claims, 4 Drawing Sheets

(56) References Cited

U.S. PATENT DOCUMENTS

| | | | | |
|---|---|---|---|---|
| 8,077,726 | B1* | 12/2011 | Kumar | H04L 45/22 370/395.31 |
| 8,339,959 | B1 | 12/2012 | Moisand et al. | |
| 8,619,550 | B2* | 12/2013 | Pan | H04L 43/0811 370/217 |
| 9,021,066 | B1* | 4/2015 | Singh | H04L 41/147 709/220 |
| 9,253,097 | B1* | 2/2016 | Barman | H04L 47/122 |
| 9,794,165 | B1* | 10/2017 | Wood | H04L 45/125 |
| 2003/0028818 | A1* | 2/2003 | Fujita | H04L 1/22 714/4.2 |
| 2005/0207347 | A1* | 9/2005 | Ishinishi | H04L 41/0806 370/241 |
| 2006/0031490 | A1* | 2/2006 | Provine | H04L 45/28 709/225 |
| 2008/0019266 | A1* | 1/2008 | Liu | H04L 45/00 370/228 |
| 2011/0205885 | A1* | 8/2011 | Kini | H04L 12/437 370/217 |
| 2012/0224506 | A1* | 9/2012 | Gredler | H04L 45/04 370/254 |
| 2013/0044586 | A1* | 2/2013 | Hanif | H04L 45/22 370/218 |
| 2013/0058324 | A1* | 3/2013 | Zhang | H04L 45/50 370/351 |
| 2014/0146664 | A1* | 5/2014 | Amante | H04L 45/50 370/228 |
| 2014/0198634 | A1* | 7/2014 | Kumar | H04L 45/00 370/228 |
| 2014/0269261 | A1* | 9/2014 | D'Souza | H04L 41/0668 370/225 |
| 2015/0281045 | A1* | 10/2015 | Torvi | H04L 45/28 370/228 |

OTHER PUBLICATIONS

"Configuring a bypass LSP," retrieved from http://www.brocade.com/content/html/en/configuration-guide/netiron-05900-mplsguide/GUID-CD59B233-142A-4FB5-BEF1-3D0D, Jul. 15, 2016, 2pp.

Barth et al., "PCEP Extensions for RSVP-TE Local-Protections with PCE-Stateful," PCE Working Group Internet-Draft, draft-cbrt-pce-stateful-local-protection-00, Jul. 6, 2015, 9 pp.

"Multiple Bypass LSPs for Link Protection," Juniper Networks, Feb. 10, 2015, 1 pp.

Pan et al., "Fast Reroute Extensions to RSVP-TE for LSP Tunnels," RFC 4090, Network Working Group, May 2005, 38 pp.

Extended Search Report from counterpart European Application No. 17193545.5, dated Feb. 12, 2018, 7 pp.

Response to Extended Search Report dated Feb. 12, 2018, from counterpart European Application No. 17193545.5, filed Oct. 1, 2018, 14 pp.

\* cited by examiner

DETERMINISTICALLY SELECTING A BYPASS LSP FOR A DEFINED GROUP OF PROTECTED LSPS

TECHNICAL FIELD

The disclosure relates to packet-based computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Border Gateway Protocol (BGP).

Multi-protocol Label Switching (MPLS) is a mechanism used to engineer specific traffic patterns within Internet Protocol (IP) networks. By using MPLS, a device, such as an ingress router or network controller, can set up a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System-Intermediate System (ISIS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generally as label switching routers (LSRs). A set of packets to be forwarded along the LSP is referred to as a forwarding equivalence class (FEC). A plurality of FECs may exist for each LSP, although there may, in some examples, be only one active LSP for any given FEC. Typically, a FEC definition includes the IP address of the destination of the LSP, e.g., an IP address assigned to the egress router of the LSP. In general, each router along the LSP maintains a context that associates a FEC with an incoming label and an outgoing label. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, the LSR performs a lookup in the context and swaps the MPLS label according to the information in its forwarding table based on the lookup and forwards the packet to the appropriate downstream LSR or LER. The egress LER removes the label from the packet and forwards the packet to its destination in accordance with non-label based packet forwarding techniques.

SUMMARY

In general, this disclosure describes techniques for managing setup of bypass LSPs along a bypass tunnel between a point of local repair (PLR) router and a merge point (MP) router in a network, where in response to a network event (e.g., node or link failure) the bypass LSPs can be used for fast reroute of traffic traversing one or more protected LSPs. The techniques of this disclosure allow for a potential PLR router to be configured to operate on certain protected LSPs as a group. The techniques of this disclosure provide the PLR router a mechanism of deterministic bypass LSP selection for the set of protected LSPs. That is, instead of the PLR router considering only available bandwidth when selecting a bypass LSP for each protected LSP, which may provide non-deterministic results, the techniques of this disclosure provide an interface mechanism that allows an administrator or network management system to configure the PLR to select from a defined set of particular bypass LSPs, or specify particular characteristics that a bypass LSP must possess, and map particular protected LSPs to such a bypass LSP.

In some examples, a network device (e.g., the PLR router) is configured to present a user interface that supports a command syntax allowing a user to define a group of protected LSPs transiting the point of local repair (PLR). The user interface further supports a command syntax to receive input, e.g., from a user, agent or management system, defining one or more bypass LSPs, such as by defining characteristics, parameters, or constraints for the bypass LSPs. The user interface further supports a syntax to receive input to define a mapping of the group of LSPs to the one or more defined bypass LSPs. In response to receiving configuration data mapping the group of LSPs to the one or more bypass LSPs, the PLR router may automatically signal the one or more bypass LSPs and programs forwarding information of the PLR router to include alternate next hops for forwarding traffic from the group of LSPs to the one or more bypass LSPs. The PLR router then uses the alternate next hops for forwarding traffic from the group of LSPs in response to detecting a failure of the primary path for any LSPs in the group of LSPs.

The techniques of this disclosure may provide one or more advantages. For example, the techniques of this disclosure may provide an administrator with fine-grained control of mapping protected LSPs to bypass LSPs for fast reroute, and may enable an administrator to maintain network-wide quality of service even during failures.

In one example, a method includes receiving, by a network device, first data defining a group of LSPs, receiving, by the network device, second data defining one or more constraints for one or more bypass LSPs, and receiving, by the network device, third data defining a mapping between the group of LSPs and the one or more bypass LSPs.

The method also includes, in response to receiving the third data, automatically signaling, by the network device, a bypass LSP in accordance with the one or more constraints, selecting, by the network device and based on the mapping, a respective alternate next hop for rerouting network traffic received on each LSP of the group of LSPs to the signaled bypass LSP, and programming a forwarding component of the network device to install each of the respective alternate next hops as alternate next hops to primary next hops for the LSPs of the group of LSPs.

In another example aspect, a network device includes a management interface executed by processing circuitry of the network device and configured to receive first data defining a group of LSPs, receive second data defining one or more constraints for one or more bypass LSPs, and receive third data defining a mapping between the group of LSPs and the bypass LSP. The network device also includes a routing component executed by the processing circuitry and configured to automatically signal a bypass LSP in accordance with the one or more constraints, select, based on the mapping, a respective alternate next hop for rerouting network traffic received on each LSP of the group of LSPs to the signaled bypass LSP, and program a forwarding component of the network device to install each of the respective alternate next hops as alternate next hops to primary next hops for the LSPs of the group of LSPs.

In a further example aspect, a computer-readable storage medium includes instructions for causing a programmable processor of a network device to receive first data defining a group of LSPs, receive second data defining one or more constraints for one or more bypass LSPs, receive third data defining a mapping between the group of LSPs and the one or more bypass LSPs, in response to receiving the third data, automatically signal a bypass LSP in accordance with the one or more constraints, select, based on the mapping, a respective alternate next hop for rerouting network traffic received on each LSP of the group of LSPs to the signaled bypass LSP, and program a forwarding component of a network device to install each of the respective alternate next hops as alternate next hops to primary next hops for the LSPs of the group of LSPs.

The details of one or more examples are set forth in the accompanying drawings and the description below. Other features, objects, and advantages will be apparent from the description and drawings, and from the claims.

DETAILED DESCRIPTION

Figure 1:
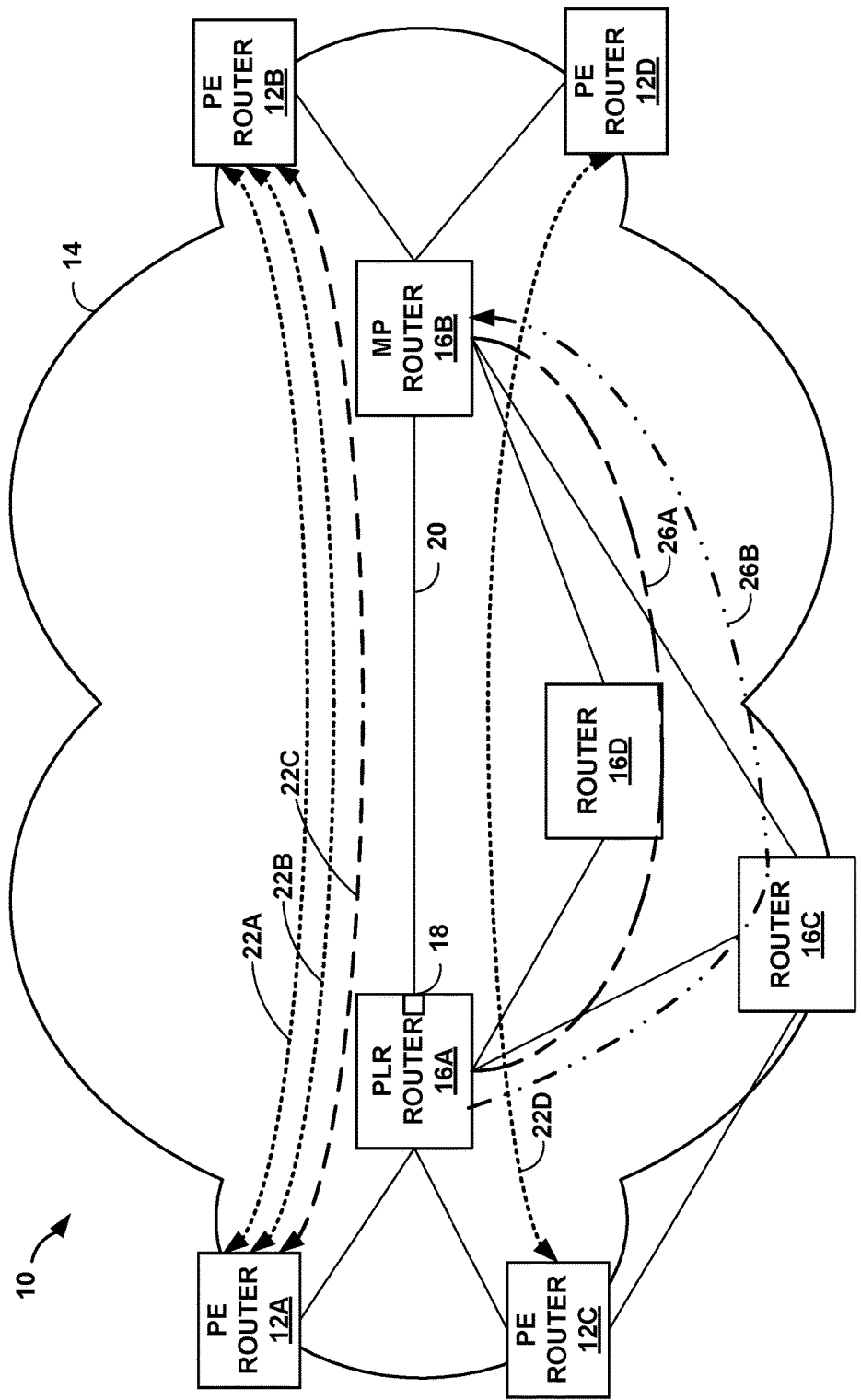
FIG. 1 is a block diagram illustrating an example system in which routers are configured to forward network traffic in accordance with the techniques of this disclosure.

FIG. 1 is a block diagram illustrating an example network system 10 in which provider edge (PE) routers 12A-12D ("PE routers 12") and routers 16A-16D ("routers 16") of network 14 are configured to forward network traffic (e.g., network packets) in accordance with the techniques of this disclosure. In the example of FIG. 1, router 16A is a point of local repair (PLR) router along the path of each of label switched paths (LSPs) 22A-22D ("LSPs 22"), and router 16B is a merge point (MP) router along the path of each of LSPs 22. In the example of FIG. 1, PLR router 16A and MP router 16B are transit routers, i.e., intermediate routers along LSPs 22 that are neither an ingress router nor an egress router of the LSPs.

In this example, PE router 12A is the ingress router of LSPs 22A, 22B, and 22C, and PE router 12B is the egress router of LSPs 22A, 22B, and 22C. PE router 12C is the ingress router of LSP 22D, and PE router 12D is the egress router of LSP 22D. Each of LSPs 22 extends along respective paths that pass through PLR router 16A, link 20, and router 16B. Although shown in FIG. 1 for purposes of example as having four LSPs 22, there may be many more than four LSPs in network 14 established through PLR router 16A and MP router 16B.

PE routers 12 and routers 16 represent any network device that routes or otherwise forwards traffic through network 14. Typically, routers 12, 16 represent L3 packet-switching devices that operate at L3 to exchange routing information using a routing protocol, such as an Interior Gateway Protocol (IGP), describing a current topology of network 14. Routers 12, 16 process the routing information, selecting paths through its representation of the topology of network 14 to reach all available destinations to generate forwarding information. In other words, routers 12, 16 reduce these paths to "next hops" that identify interfaces to which to forward traffic destined for respective destinations, where the forwarding information includes this list of next hops. Routers 12, 16 then install this forwarding information in a forwarding plane of the router, whereupon the forwarding plane forwards received traffic in accordance with the forwarding information.

In some examples, network 14 may be a service provider network. For example, network 14 may represent one or more networks owned and operated by a service provider (which is commonly a private entity) that offer one or more services for consumption by subscriber networks. In this context, network 14 is typically a layer three (L3) packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

While not shown in the example of FIG. 1, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

PLR router 16A may have previously computed and signaled a bypass tunnel (not shown) between PLR router 16A and MP router 16B along a backup path for protecting link 20, such as by using the Resource Reservation Protocol with Traffic Engineering extensions (RSVP-TE). PLR router 16A is the point of local repair for the bypass tunnel, and MP router 16B is the merge point for the bypass tunnel. A bypass tunnel is an LSP that provides link protection for link 20 between router 16A and router 16B and that is signaled for transporting one or more LSPs. In other words, a bypass tunnel a single LSP that is specifically signaled to serve as a back up (e.g., for providing link and/or node protection)

for a set of LSPs, referred to as the protected LSPs. Because of the soft-state nature of RSVP, PLR router 16A is also expected to signal bypass LSPs to be carried by the bypass tunnel towards MP router 16B. The bypass LSPs (also referred to as "backup LSPs") help in maintaining state across PLR router 16A and MP router 16B. PLR router 16A can then send the network traffic received along a protected LSP 22 through a bypass LSP such as one of bypass LSPs 26A-26B ("bypass LSPs 26). Router 16A may establish the bypass tunnel in accordance with MPLS fast reroute techniques, as described in P. Pan, "Fast Reroute Extensions to RSVP-TE for LSP Tunnels," Network Working Group RFC 4090, May 2005, the entire contents of which are incorporated by reference herein.

For example, as the point of local repair (PLR) and ingress of the bypass tunnel, router 16A may establish the bypass tunnel and signal one or more bypass LSPs to protect one or more other existing LSPs (such as LSPs 22) that traverse at least router 16A and router 16B and do not traverse router 16C or router 16D. The term "protected LSP" refers to an LSP for which fast reroute protection is requested, such as by the ingress router of the LSP. In some examples, router 16A may establish the bypass tunnel upon request by an ingress router of one of these protected LSPs 22. For example, router 16A may receive a resource reservation request (e.g., a RSVP-TE Path request) from ingress PE router 12A that includes a fast reroute object in which a "local protection desired" flag, or other fast reroute flag, is set. After PLR router 16A establishes the bypass tunnel, router 16A maintains forwarding information in a data plane of PLR router 16A that allows router 16A to send traffic through the bypass tunnel in response to detecting failure of a protected resource such as a node or link 20.

The Network Working Group's Request for Comments (RFC) 4090, entitled "Fast Reroute Extensions to RSVP-TE for LSP Tunnels," defines two methods of local repair. The one-to-one backup method creates detour LSPs for each protected LSP at each potential point of local repair, and the facility backup method creates a bypass tunnel that can be used with multiple LSPs to protect a potential failure point. That is, the facility backup method provides link or node protection by pre-calculating a bypass path for the set of LSPs traversing a link or node. By taking advantage of MPLS label stacking, the bypass tunnel can protect a set of LSPs that have similar backup constraints. Both methods can be used to protect links and nodes during network failure. As one-to-one detour LSPs results in higher number of states, facility backup for LSPs may be a preferred method in some cases.

However, in the absence of the techniques of this disclosure, the facility backup method provides no control over which protected LSPs map to which bypass LSPs, and provides no control over how a bypass LSP is selected for a set of protected LSPs. For instance, there may be a case where despite a protected interface being configured with an option to have multiple bypass LSPs (e.g., a maximum bypass LSP setting set to greater than 1), all of these bypass LSPs may not yet be signaled because a single already-signaled bypass LSP has sufficient bandwidth to provide the backup for all of the protected LSPs on the interface. The techniques of this disclosure provide a mechanism for configuring the point of local repair router 16A to bind the set of protected LSPs to the single bypass LSP that is already signaled.

The techniques of this disclosure enable PLR router 16A to be configured for deterministically selecting one or more bypass LSPs for a defined group of protected LSPs. That is, instead of PLR router 16A considering only available bandwidth when selecting a bypass LSP for each protected LSP, the techniques of this disclosure allow an administrator to select particular bypass LSPs, or specify particular characteristics that a bypass LSP must possess, and map particular protected LSPs to such a bypass LSP. This may provide finer-grained control of LSP traffic fast reroute to bypass LSPs, and may enable an administrator to maintain network-wide quality of service even during failures.

The ability to map protected LSPs to certain bypass LSPs may be particularly useful in certain scenarios, such as where a group of protected LSPs should be protected by a bypass LSP having certain characteristics (e.g., to satisfy QoS requirements), while other protected LSPs do not require a bypass LSP having certain characteristics and may therefore use a different bypass LSP.

The techniques of this disclosure allow for configuring a potential PLR router 16A to operate on certain protected LSPs as a set or group. For example, PLR router 16A is configured to provide a user interface that supports a syntax to receive data (e.g., from a user such as an administrator of network 14) defining a group of LSPs (i.e., a set of LSPs). For example, an administrator can define a group of LSPs in terms of a characteristic of the group, such as by using a regular expression for LSP name (e.g., LSPs having the term "voice" in the LSP name). In this example, the group of LSPs is defined using a regular expression that matches one or more LSP names. As another example, the group of LSPs may be defined by listing individual LSPs defining the individual LSPs as members of the group of LSPs. For example, as indicated by the different dashed lines in FIG. 1, LSPs 22A, 22B, and 22D may be LSPs established for carrying a relatively higher-priority type of network traffic (e.g., a higher Quality of Service (QoS) class), such as voice traffic, and LSP 22C may be an LSP established for carrying a lower-priority type of network traffic, such as data traffic. PLR router 16A may receive data from an administrator for configuring a group of LSPs that includes each of LSPs 22A, 22B, and 22D. For example, LSPs 22A, 22B, 22D may have a common characteristic (e.g., for carrying voice traffic) that appears in each of their LSP names ("voice"), and so the LSP name of each of LSPs 22A, 22B, and 22D would match the regular expression used by an administrator in defining the group of LSPs.

PLR router 16A is also configured to receive data defining characteristics for one or more bypass LSPs to be established for forwarding network traffic between PLR router 16A and MP router 16B on a path that avoids protected link 20. For example, the user interface of PLR router 16A may be configured to support a syntax to receive data defining one or more bypass LSPs, such as by defining characteristics that the bypass LSPs should possess, or constraints the bypass LSPs should satisfy. PLR router 16A is also configured to receive data defining a mapping of the group of LSPs to one or more of the bypass LSPs. For example, the user interface of PLR router 16A may be further configured to support a syntax to receive data defining a mapping of the group of LSPs to one or more of the bypass LSPs, such that PLR router 16A will signal the bypass LSP and install forwarding information that causes traffic to be rerouted from the LSPs of the group of LSPs onto the one or more bypass LSPs.

For example, based on received configuration data specifying quality of service (QoS) requirements for a bypass LSP, PLR router 16A may select a path for bypass LSP 26A that satisfies the QoS requirements, and PLR router 16A signals bypass LSP 26A to follow the selected path. Based on the received configuration data defining mappings of an LSP group to one or more bypass LSPs, when installing fast reroute alternate next hops to its forwarding information for protected LSPs 22, PLR router 16A deterministically selects which protected LSPs 22 are mapped to the manually defined bypass LSP 26A, according to the defined mappings. For example, PLR router 16A installs alternate next hops for rerouting traffic from LSPs 22A, 22B, and 22D to bypass LSP 26A. If bypass LSP 26A does not have sufficient bandwidth to accommodate all of protected LSPs 22, PLR router 16A may additionally signal a second bypass LSP 26B, and may select a path for bypass LSP 26B that need not satisfy the QoS requirements required for the first bypass LSP 26A. In this example, PLR router 16A installs alternate next hops for rerouting traffic from LSP 22C to bypass LSP 26B.

In response to detecting a failed resource between PLR router 16A and MP router 16B (e.g., link 20), PLR router 16A redirects traffic over the bypass tunnel from PLR router 16A to MP router 16B. That is, PLR router 16A forwards traffic from the protected LSPs 22 onto the appropriate bypass LSP 26 based on the forwarding information of PLR router 16A. Responsive to detecting failure of link 20, PLR router 16A performs a soft reroute action to reroute the traffic received on LSPs 22 onto a bypass LSP signaled along the previously-established bypass tunnel. For example, PLR router 16A may update its stored forwarding information to change the primary next hops for LSPs 22, such as by setting a next hop for the bypass LSP as the primary next hop for traffic received for LSPs 22. As a result, after detecting the link failure, PLR router 16A will forward traffic received on LSPs 22A, 22B, and 22D on to bypass LSP 26B, and PLR router 16A will forward traffic received on LSP 22C on to bypass LSP 26A.

The techniques of this disclosure provides administrative control over how PLR router 16A selects bypass LSPs for a defined group of protected LSPs transiting protected interface 18. An administrator can use the techniques described herein to define many different groups of LSPs on PLR router 16A, for a single protected interface or for multiple protected interfaces. PLR router 16A may therefore receive configuration data defining multiple groups of LSPs. The administrator can similarly define multiple "manual bypass LSPs," and PLR router 16A in turn receives configuration data defining multiple manual bypass LSPs. In some examples, the administrator may input data defining a mapping of the different groups of LSPs to respective bypass LSPs or groups of bypass LSPs. For example, PLR router 16A may receive data defining a group of bypass LSPs, and data mapping a group of protected LSPs to the group of bypass LSPs. In selecting a bypass LSP for installing forwarding state, based on the defined mapping, PLR router 16A can select from any of the bypass LSPs in the group of bypass LSPs to use for an alternate next hop for a protected LSP. In this way, PLR router 16A may be configured to receive data mapping a few LSPs to a bypass LSP or to any of a few bypass LSPs.

Figure 2:
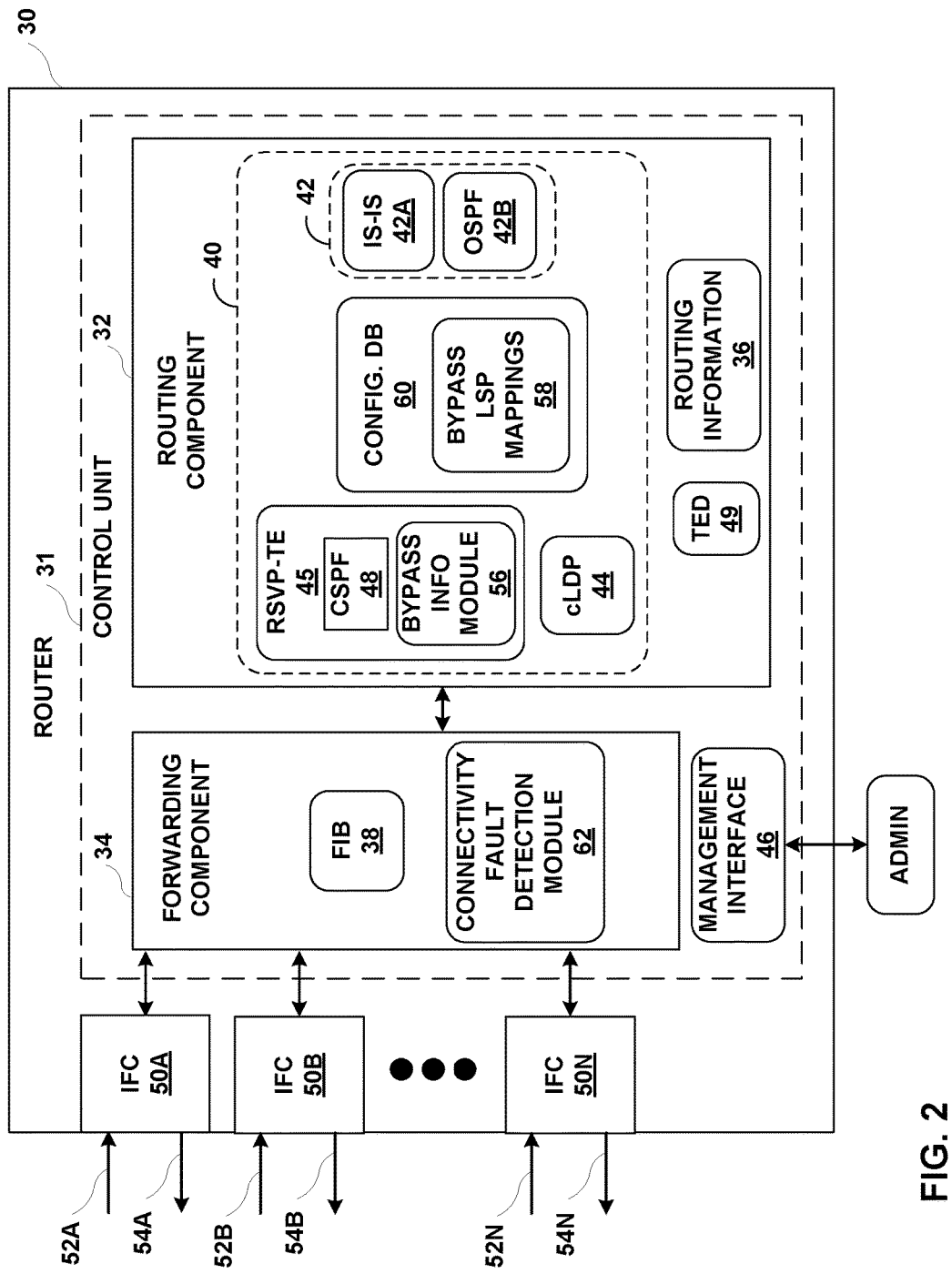
FIG. 2 is a block diagram illustrating an example embodiment of a point of local repair (PLR) network device in accordance with the techniques of this disclosure.

FIG. 2 is a block diagram illustrating an example embodiment of a point of local repair (PLR) network device in accordance with the techniques of this disclosure. PLR router 30 may, for example, represent any of routers 12 or 16 of FIG. 1, such as PLR router 16A, for example. In this example, PLR router 30 includes a control unit 31 that comprises a routing component 32 and a forwarding component 34. Control unit 31 may include programmable circuitry configured for performing functions described herein. In addition, PLR router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54"). Although described for purposes of example as a router, the techniques of this disclosure are not limited to network devices that perform only routing functions, but are applicable to network devices generally.

Routing component 32 primarily provides an operating environment for control plane protocols 40. For example, one or more IGP routing protocols 42, such as Intermediate System to Intermediate System (ISIS) routing protocol 42A, or the Open Shortest Path First (OSPF) routing protocol 42B, maintain routing information 36 to reflect the current topology of a network and other network entities to which PLR router 30 is connected. In particular, IGPs 42 update routing information 36 to accurately reflect the topology of the network and other entities. PLR router 30 may execute other example routing protocols such as Border Gateway Protocol (BGP).

Routing component 32 generates and programs forwarding component 34 with FIB 38 that associates network destinations with specific next hops and corresponding interfaces ports of IFCs 50 in accordance with routing information 36. Routing component 32 may generate FIB 38 in the form of a radix tree having leaf nodes that represent destinations within the network, for example.

Based on FIB 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits (e.g., ASICs) normally associated with high-end routing components of a network router. Further details of one example embodiment of PLR router 30 can be found in U.S. Pat. No. 8,339,959, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a LSP, which may be accumulated by IGPs 42. For example, RSVP-TE 45 may generate and maintain a traffic engineering database 49, including bandwidth reservations for paths associated with MPLS LSPs. Constrained Shortest Path First (CSPF) process 48 computes a shortest path or paths for an MPLS LSP based on specified constraints and bandwidth availability information (e.g., from traffic engineering database (TED) 49) associated with the links within the network. IGPs 42 may, in turn, advertise the calculated bandwidth availability information in TED 49 to other peer routers. As another example, constrained Label Distribution Protocol (CR-LDP) 44 may send and receive label mapping messages for establishing a LSP.

PLR router 30 receives RSVP-TE Path messages from PE routers 12A and 12C for setting up LSPs 22A and 22B, respectively. In other examples, RSVP-TE Path messages may be received from a network controller, path computation element (PCE) or the like. In response, RSVP-TE module 45 of router 30 forwards the RSVP-TE Path messages to router 16B, and also sends RSVP-TE Resv messages back to the ingress routers confirming the reservation of the requested bandwidth. RSVP-TE module 45 may also inform IGPs 42, which in turn can update TED 49 with current available bandwidth information. IGPs 42 may also forward the updated current available bandwidth information to other IGP peers. RSVP-TE module 45 may also store MPLS labels to FIB 38 for LSPs 22A and 22B. Routing component 32 may also program primary next hops for LSPs 22A and 22B to FIB 38, indicating next hops to which to forward the network traffic encapsulated with the MPLS labels.

RSVP-TE module 45 operates in accordance with a resource reservation protocol such as the RSVP-TE protocol. In accordance with the techniques of this disclosure, RSVP-TE module 45 includes bypass info module 56, which selects a bypass LSP based on bypass LSP mappings 58 defined by administrator, as described in further detail below.

RSVP-TE module 45 of PLR router 30 sends resource reservation messages (e.g., RSVP-TE Path messages) and receives resource reservation reply messages (e.g., RSVP-TE Resv messages) from the MP router. RSVP-TE module 45 stores the label mapping information from the received resource reservation reply messages in FIB 38.

PLR router 30 also includes management interface 46 by which an administrator ("ADMIN"), script, or network management system can configure PLR router 30. In some examples, management interface 46 may present a command line interface. In some examples, management interface 46 may be presented locally on PLR router 30, or management interface 46 may output an indication of information for display at a separate display device. In some examples, management interface 46 be used for receiving information by way of an Application Programming Interface (API) from a Software Defined Network (SDN) controller or Path Computation Element (PCE), for example.

In accordance with the techniques of this disclosure, PLR router 16A is configured to present a user interface by which a user, automated script or network management system specifies commands for grouping of LSPs at the point of local repair (PLR). In some examples, management interface 46 is configured to support a text-based command syntax for receiving a command (e.g., "set protocols rsvp") to define a group of LSPs by using an "lsp-set" option:

set protocols rsvp lsp-set [lsp_group_name] match-criteria transit?

In one example implementation, possible completions to the command include:

| [Enter] | Executes this command |
|---|---|
| +apply-groups | Specifies configuration groups from which to inherit configuration data |
| +apply-groups-except | Specifies groups from which configuration data should not be inherited. |
| lsp-name | Defines the LSP group in terms of LSP name(s) that matches this string. |
| lsp-regex | Defines the LSP group in terms of all LSPs that match this regular expression pattern. |
| p2mp-name | Defines the LSP group in terms of P2MP names that match this string |
| p2mp-regex | Defines the LSP group in terms of P2MP names that match this regular expression pattern |
| \| | Pipe through a command, which enables to filter command output. |

In response to receiving the commands defining the group of LSPs, management interface module 46 may store the received definitions in association with the LSP Group Name, e.g., to bypass LSP mappings 58 (e.g., to memory).

The user interface presented by management interface 46 may additionally receive commands from an administrator, automated script or network management system to configure one or more 'manual bypass LSP(s)'. For example, management interface 46 is configured to support a syntax for receiving a command to define one or more bypass (facility backup) LSPs, such as:

set protocols rsvp interface [protected interface] link-protection bypass [bypass lsp name] ?

In one example implementation, possible completions to the command include:

| [Enter] | Execute this command |
|---|---|
| admin-group | Defines an administrative group policy that applies to the bypass LSP |
| +apply-groups | Configuration groups from which the bypass LSP should inherit configuration data |
| +apply-groups-except | Groups from which the bypass LSP should not inherit configuration data |
| bandwidth | Bandwidth for each bypass (bps) |
| class-of-service | Class of service for the bypass LSP (0 . . . 7) |
| description | Text description of bypass |
| exclude-srlg | Exclude SRLG links |
| hop-limit | Maximum number of allowed router hops for bypass LSP (2 . . . 255) |
| no-cspf | Disable automatic path computation |
| path | Explicit route of bypass path |
| priority | Preemption priorities for bypass |
| to | Address of egress router |
| \| | Pipe through a command |

In response to receiving the commands configuring one or more manual bypass LSPs, management interface module 46 may store the received definitions in association with the bypass LSP name, e.g., to bypass LSP mappings 58 (e.g., to memory).

The max-bypasses statement allows the PLR router to signal multiple bypass LSPs for link/node protected MPLS LSP. The maximum number of bypass LSPs may be set to 1 as a default value, in some examples. In this case, the user must enter a value greater than 1 (e.g., 2) to allow the PLR router to signal more than one bypass LSP on an interface. For example, management interface 46 is configured to support a syntax for receiving a command to set a maximum number of bypass LSPs using:

set protocols rsvp interface [protected interface] link-protection bandwidth [bandwidth]
set protocols rsvp interface [protected interface] link-protection max-bypasses [max number 0-99]

In response to receiving the command setting the maximum number of bypass LSPs, management interface module 46 may store the received configuration to configuration database 60 (e.g., to memory). The above configuration does not guarantee that the configured maximum number of bypass LSPs will be signaled. The 'max-bypasses' being greater than 1 allows the PLR router to signal another bypass LSP when none of the existing bypass LSP(s) can satisfy the requirement of the protected LSP.

In accordance with the techniques of this disclosure, management interface 46 is configured to support a syntax for receiving a command (e.g., set protocols rsvp lsp-set

[lsp_group_name] bypass") to define a mapping of the protected LSP set/group to use a particular bypass LSP or select a set of bypass LSPs mapped to MPLS LSP set/group. As one example, the below command line interface syntax may be supported by management interface 46 to dynamically add specific bypass LSPs to the pre-defined group of LSPs specified by the lsp-set option:

set protocols rsvp lsp-set [lsp_group_name] bypass?

In one example implementation, possible completions to the command include:

| | |
|---|---|
| [bypass lsp set] | a set of lsps can be defined using [ ] |
| [bypass lsp name] | bypass lsp name |

In response to receiving the commands defining a mapping between bypass LSPs to an LSP set, management interface 46 stores the mapping to bypass LSP mappings 58 of configuration database 60 (e.g., to memory). In this manner, the administrator or other user can specify one or more bypass LSPs to provide link/node protection to a group of LSPs transiting a protected interface.

Specifically, routing component 32 parses the data stored in configuration database 60, including bypass LSP mappings 58. Routing component 32 detects the presence of bypass LSP mappings 58 and causes RSVP-TE module 45 to select paths for and signal one or more bypass LSPs based on the bypass LSP mappings 58. For example, CSPF process 48 of RSVP-TE module 45 computes a shortest path or paths for the bypass LSPs that satisfy the constraints specified by the bypass LSP definition.

In some examples, such as when the bypass LSPs are defined as a list using [bypass lsp set], bypass info module 56 may scan through the list of bypass LSPs specified by the [bypass lsp set] command and activate the best fitting bypass LSP. In this solution, bypass info module 56 reduces the list of bypass LSPs to the defined set through the above command. For example, if bypass info module 56 determines there are any bypass LSPs that are already signaled in "[bypass lsp set]" and if any of these already-signaled bypass LSPs is able to meet the requirement of protected LSP; then bypass info module 56 selects that already-signaled bypass LSP. If bypass info module 56 determines there is no signaled bypass LSP in "[bypass lsp set]", or bypass info module 56 determines none of the already signaled bypass LSP is able to meet the requirement of protected LSP, then bypass info module 56 will choose from a not-yet-signaled bypass LSP and will invoke RSVP-TE module 45 to signal that bypass LSP. This mapping approach may ensure that a bypass LSP is signaled and that the bypass LSP protects the lsp-set/group to which the bypass LSP is mapped.

RSVP-TE module 45 signals the selected bypass LSP(s) by outputting one or more RSVP-TE Path messages (e.g., to router 16C or router 16D, depending on the selected path), and receives RSVP-TE Resv messages in response to the Path messages confirming reservation of the requested bandwidth. In some examples, the Path message includes an explicit route object (ERO) specifying the selected path. In examples in which the PLR router 30 receives configuration data specifying a bypass LSP name and data defining an explicit route of a bypass path for signaling a bypass LSP having the bypass LSP name, the path message may include an ERO based on the configuration data defining the explicit route of the bypass path.

Routing component 32 may also program to FIB 38 alternate next hops for LSPs 22A and 22B, where the alternate next hops are for forwarding network traffic along the bypass LSPs (e.g., one or more of bypass LSPs 26A, 26B). RSVP-TE module 45 may also store MPLS labels to FIB 38 for use in forwarding traffic along the bypass LSPs.

After LSPs 22 are established, PLR router 30 may in some examples detect a failure condition of a link, such as link 20 (FIG. 1). For example, connectivity fault detection module 62 may run a session on link 20, and can detect when link 20 fails. In some examples, the link 20 is managed by the kernel of router 30, and the routing protocol daemon (RPD) and/or RSVP-TE module 45 is informed by the kernel if there is any change. RSVP-TE module 45 will react depending on its configuration. In the example of a one-hop session (IGP) at a transit router adjacent to the failed link, then a Periodic Packet Management Daemon (PPMD) (not shown) of routing component 32 may delegate connectivity fault detection functionality to a forwarding component monitor module (e.g., pfemon). Otherwise, routing component 32 may do fault detection. Example techniques for connectivity fault detection in a multi-chassis routing system are described in U.S. Pat. No. 7,720,061, filed Aug. 18, 2006, entitled "Distributed Solution for Managing Periodic Communications in a Multi-Chassis Routing System," the entire contents of which are incorporated by reference herein.

In some examples, in response to detecting a failure condition of a protected resource between PLR router 30 and a merge point router, connectivity fault detection module 62 informs RSVP module 45 in the control plane of router 30 of the detected condition. In other examples, connectivity fault detection module 62 may detect a node failure condition, such as where an intermediate router is present on the path between the PLR router 30 and a merge point router.

Although illustrated for purposes of example as being positioned in the forwarding component 34 (e.g., in the forwarding plane of PLR router 30), connectivity fault detection module 62 could alternatively be located in the control plane of PLR router 30, such as within routing component 32. In the case of connectivity fault detection module 62 being located in the control plane, connectivity fault detection module 62 may poll the forwarding component 34 for statistics and information, and compare the data received from forwarding component 34 to configured thresholds, for example. In one example, connectivity fault detection module 62 may comprise a software application programming interface (API) in the control plane of PLR router 30 that notifies notify the control plane of the status of aspects of forwarding component 34, such as next hop utilization statistics, and forwarding component 34 responds by providing the requested statistics. In this case, connectivity fault detection module 62 might perform bookkeeping/accounting of bandwidth in the control plane, for example.

When connectivity fault detection module 62 determines that a protected resource has failed, connectivity fault detection module 62 can notify RSVP-TE module 45. After detecting failure of a protected resource, RSVP-TE module 45 or routing component 32 of PLR router 30 may also update FIB 38 to promote an alternate next hop along the bypass LSP to become the primary next hop (e.g., to router 16C along bypass LSP 26B), such as by changing weights associated with the next hops in the forwarding information. For example, bypass info module 56 may select a bypass LSP based on the bypass LSP mappings 58. In some examples, PLR router 30 may also then delete the next hop along link 20 from the forwarding state. Examples of updating forwarding state for fast reroute are described in U.S. Pat. No. 8,077,726, entitled, "FAST REROUTE FOR MULTIPLE LABEL SWITCHED PATHS SHARING A SINGLE INTERFACE," issued Dec. 13, 2011, the entire contents of which are incorporated by reference herein.

Figure 3:
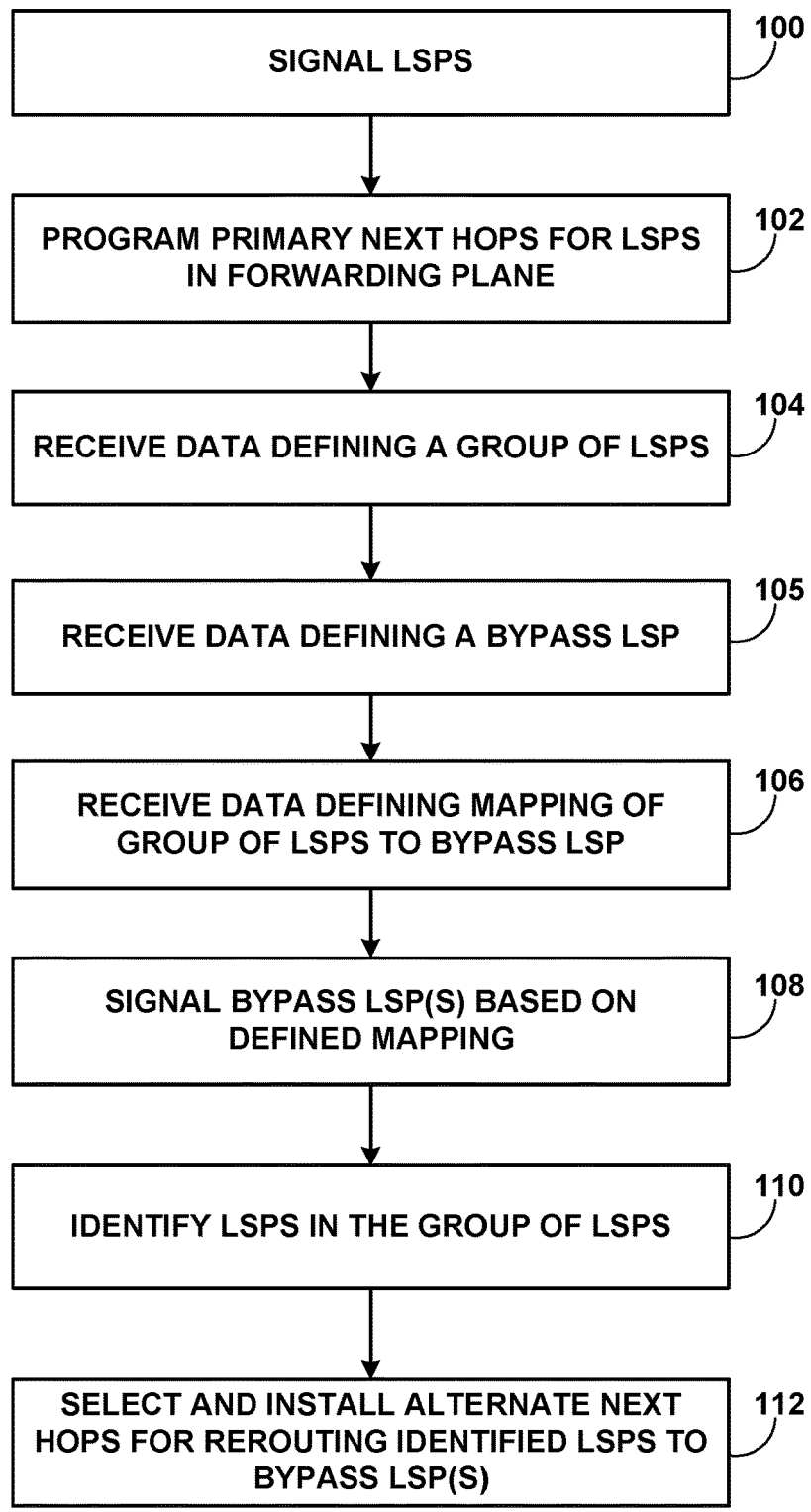
FIG. 3 is a flowchart illustrating example operation of a network device in accordance with the techniques of this disclosure.

FIG. 3 is a flowchart illustrating example operation of a network device in accordance with the techniques of this disclosure. FIG. 3 will be described with reference to FIGS. 1-2 for purposes of example. For example, FIG. 3 refers to a PLR network device, which in one example may be PLR router 16A of FIG. 1.

PLR router 16A may signal one or more LSPs, such as LSPs 22 (100). The LSPs may be LSPs for which PLR router 16A is a transit router, and PLR router 16A may signal the LSPs in response to receiving a request such as a request from an administrator or a resource reservation request from an ingress router of the LSPs. The request may specify that the LSPs are protected LSPs for which alternate next hops on a bypass LSP should be installed. PLR router 16A may signal each of the LSPs 22 by selecting a respective next hop along a path specified in the request and sending one or more resource reservation requests (e.g., an RSVP-TE Path message) to the next hop. PLR router 16A may also program the next hops as primary next hops in a forwarding plane of PLR router 16A (e.g., to FIG. 38) for each of the LSPs 22 (102).

PLR router 16A receives data defining a group of LSPs (104), such as via management interface 46. In some examples, the data defining the group of LSPs may be defined for a given protected interface. For example, the data may define an LSP group name for the group of LSPs. In some examples, the data may define the group of LSP by specifying an LSP name that defines the group of LSPs in terms of LSPs having names that match the LSP name. In some examples, the data may define the group of LSP by specifying a regular expression pattern that defines the group of protected LSPs in terms of all LSPs that match this regular expression pattern. PLR router 16A may store to memory an indication of the data defining the group of LSPs.

PLR router 16A receives data defining a bypass LSP, including one or more constraints for the bypass LSP (105). In some cases, PLR router 16A receives data defining multiple bypass LSPs. PLR router 16A may store to memory an indication of the data defining the multiple bypass LSPs. In some examples, the data specifies a bypass LSP name. In some examples, defined constraints for the one or more bypass LSPs may include one or more of a class of service that a path for the bypass LSPs must satisfy, an administrative group that a path for the bypass LSPs must satisfy, and a maximum number of hops for the bypass LSPs. In some examples, the data may define constraints for the one or more bypass LSPs as data defining an explicit route of a bypass path for signaling a bypass LSP of the one or more bypass LSPs.

PLR router 16A receives data defining a mapping of the group of LSPs to the bypass LSP(s) (106). PLR router 16A may store to memory an indication of the data defining the mapping. The mapping may be defined in terms of the LSP group name and the bypass LSP name, for example (e.g., as defined in steps 104 and 105). In response to receiving the data defining the mapping, PLR router 16A automatically signals a bypass LSP based on the data defining the bypass LSP (108). That is, the PLR router 16A signals the bypass LSP along a path selected by PLR router 16A to meet the constraints defined for the bypass LSP.

PLR router may, in some examples, identify particular LSPs that satisfy membership in the group of LSPs based on the data defining the group of LSPs (110). For example, PLR router 16A may go through a list of all LSPs on a protected interface and compare characteristics of the LSPs to the LSP group definition. PLR router 16A selects, based on the mapping, a respective alternate next hop for rerouting network traffic received on each LSP identified in the group of LSPs to the signaled bypass LSP, and programs the forwarding plane of PLR router 16A to install alternate next hops for rerouting the identified LSP to the bypass LSP(s) (112).

Figure 4:
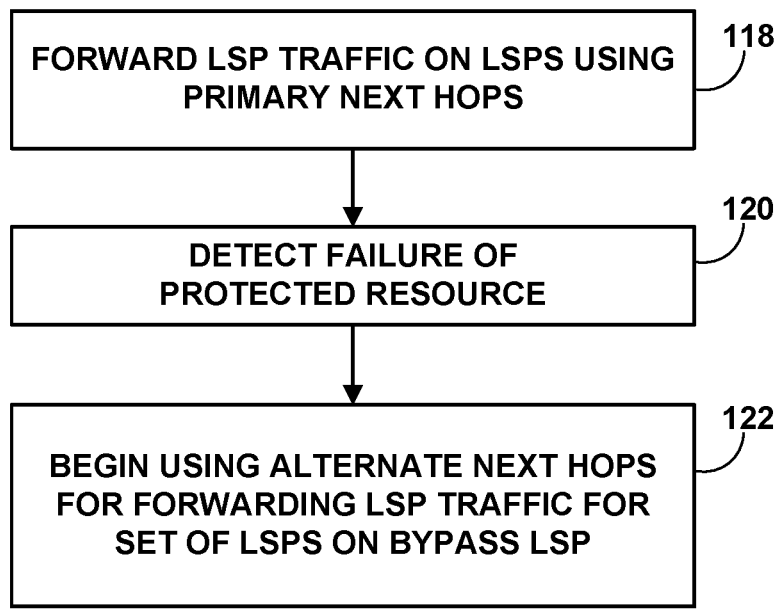
FIG. 4 is a flowchart illustrating example operation of a network device in accordance with the techniques of this disclosure.

FIG. 4 is a flowchart illustrating example operation of a network device in accordance with the techniques of this disclosure. In steady state operation, PLR router 16A forwards traffic received on the LSPs 22 using the primary next hops (118). However, PLR router 16A may detect a failure of a protected resource along a primary path of LSPs 22, e.g., using connectivity fault detection module 62 (120). The protected resource may be, for example, a protected link (e.g., link 20 of FIG. 1), or a protected node (e.g., a network device such as a router). In response to detecting the failure of the protected resource, PLR router 16A updates its forwarding plane to begin using the alternate next hops as primary next hops for the LSPs, thereby forwarding LSP traffic for all the LSPs in the group of LSPs on the bypass LSP(s) (122). For example, PLR router 16A may begin forwarding LSP traffic for LSPs 22A, 22B, and 22D on bypass LSP 26A. Bypass LSP 26A may be signaled on a path that satisfies criteria specified in the manual bypass LSP definition. PLR router 16A may have signaled multiple bypass LSPs, and as PLR router 16A determined that LSP 22C is not a member of the defined LSP group, LSP 22C is not mapped to bypass LSP 26A and thus PLR router 16A may forward LSP traffic for LSP 22C on bypass LSP 26B.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
   receiving, by a network device, first data defining a group of LSPs;
   receiving, by the network device, second data defining a bypass LSP name for a bypass LSP and one or more constraints for the bypass LSP;
   receiving, by the network device, third data defining a mapping between the group of LSPs and the bypass LSP name;
   in response to receiving the third data, automatically signaling, by the network device, the bypass LSP for the bypass LSP name in accordance with the one or more constraints;
   selecting, by the network device and based on the third data defining the mapping, a respective alternate next hop for rerouting network traffic received on each LSP of the group of LSPs to the signaled bypass LSP; and
   programming a forwarding component of the network device to install each of the respective alternate next hops as alternate next hops to primary next hops for the LSPs of the group of LSPs.

2. The method of claim 1, wherein receiving the first data, second data, and third data comprises receiving the first data, second data, and third data via a user interface of the network device that supports a command syntax to define the first data, second data, and third data.

3. The method of claim 1, wherein the command syntax to define the third data comprises a command syntax to dynamically add the bypass LSP name defined by the second data to the group of LSPs defined by the first data.

4. The method of claim 1, further comprising:
   in response to detecting failure of a protected resource along a primary path of one or more of the LSPs, updating the forwarding component to use the alternate next hops as primary next hops for forwarding network traffic received on the LSPs.

5. The method of claim 1, wherein the first data defining the group of LSPs specifies a LSP group name for the group of protected LSPs.

6. The method of claim 1, wherein the first data defining the group of LSPs specifies an LSP name that defines the group of LSPs in terms of LSPs having names that match the LSP name.

7. The method of claim 1, wherein the first data defining the group of LSPs specifies a regular expression pattern that defines the group of protected LSPs in terms of all LSPs that match the regular expression pattern.

8. The method of claim 1, further comprising:
   identifying, by the network device and based on the first data defining the group of protected LSPs, each LSP of the group of protected LSPs.

9. The method of claim 1, wherein the constraints for the bypass LSP comprise at least one member of the group consisting of a class of service, an administrative group, and a maximum number of hops.

10. The method of claim 1, wherein the constraints for the bypass LSP comprise data defining an explicit route of a bypass path for signaling the bypass LSP.

11. The method of claim 1,
    wherein the first data specifies groups from which the group of LSPs should inherit configuration data, and
    wherein the second data specifies groups from which the group of LSPs should inherit configuration data.

12. The method of claim 1, further comprising:
    receiving, by the network device, data defining a maximum number of bypass LSPs for a protected interface of the network device, wherein the maximum number is greater than one.

13. The method of claim 1, wherein receiving the third data defining the mapping comprises receiving data defining a mapping between the group of LSPs to a group of bypass LSPs, and
    wherein selecting the respective alternate next hop comprises selecting a respective alternate next hop for rerouting network traffic received on each LSP of the group of LSPs to a respective bypass LSP selected from the group of bypass LSPs.

14. A network device comprising:
    a management interface executed by processing circuitry of the network device and configured to:
    receive first data defining a group of LSPs,
    receive second data defining a bypass LSP name for a bypass LSP and one or more constraints for the bypass LSP, and
    receive third data defining a mapping between the group of LSPs and the bypass LSP name;
    a routing component executed by the processing circuitry and configured to:
    in response to the management interface receiving the third data, automatically signal the bypass LSP for the bypass LSP name in accordance with the one or more constraints,
    select, based on the third data defining the mapping, a respective alternate next hop for rerouting network traffic received on each LSP of the group of LSPs to the signaled bypass LSP, and
    program a forwarding component of the network device to install each of the respective alternate next hops as alternate next hops to primary next hops for the LSPs of the group of LSPs.

15. The network device of claim 14, wherein the management interface comprises a user interface executed by the processing circuitry and configured to support a text-based command syntax to specify the first data, second data, and third data.

16. The network device of claim 14, wherein the command syntax to define the third data comprises a command syntax to dynamically add the bypass LSP name defined by the second data to the group of LSPs defined by the first data.

17. The network device of claim 14, further comprising:
    a Resource Reservation Protocol with Traffic Engineering extensions (RSVP-TE) module that computes a path for the bypass LSP and automatically signals the bypass LSP in accordance with the one or more constraints.

18. The network device of claim 14, wherein the management interface is configured to receive data defining a maximum number of bypass LSPs for a protected interface of the network device, wherein the maximum number is greater than one.

19. The network device of claim 14, wherein the third data comprises data defining a mapping between the group of LSPs to a group of bypass LSPs, and wherein the routing component is configured to select a respective alternate next hop for rerouting network traffic received on each LSP of the group of LSPs to a respective bypass LSP selected from the group of bypass LSPs.

20. A non-transitory computer-readable storage medium comprising instructions for causing a programmable processor of a network device to:
- receive first data defining a group of LSPs;
- receive second data defining a bypass LSP name for a bypass LSP and one or more constraints for the bypass LSP;
- receive third data defining a mapping between the group of LSPs and the bypass LSP name;
- in response to receiving the third data, automatically signal the bypass LSP for the bypass LSP name in accordance with the one or more constraints;
- select, based on the third data defining the mapping, a respective alternate next hop for rerouting network traffic received on each LSP of the group of LSPs to the signaled bypass LSP; and
- program a forwarding component of a network device to install each of the respective alternate next hops as alternate next hops to primary next hops for the LSPs of the group of LSPs.

* * * * *